United States Patent Office 3,218,149
Patented Nov. 16, 1965

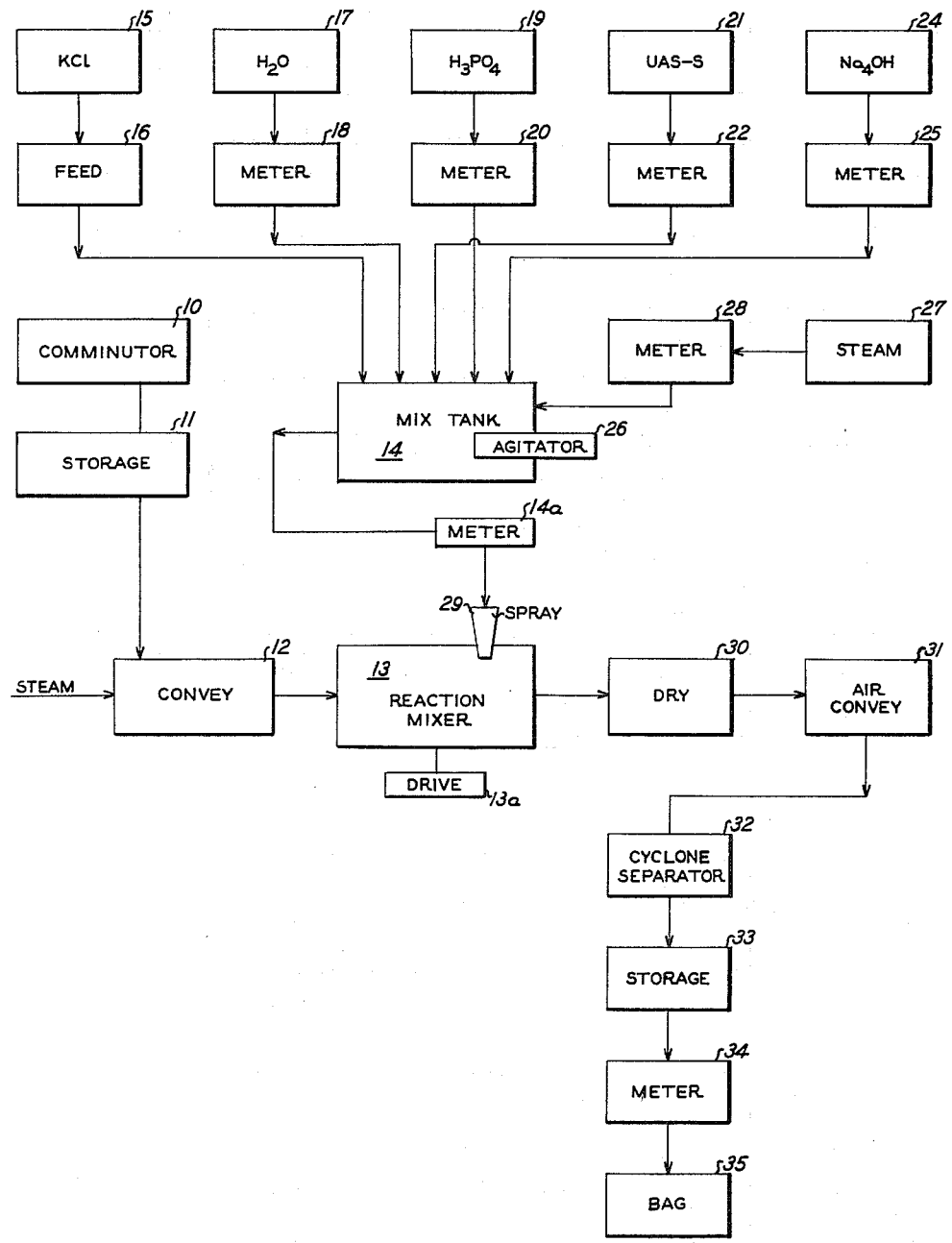

3,218,149
METHOD OF MAKING FERTILIZER, MULCH
AND SOIL CONDITIONER
Reavis C. Sproull, Richmond, Gene A. Pierce, West Point, and Raymond M. Tokarz, Port Richmond, Va., assignors to The Chesapeake Corporation of Virginia, West Point, Va.
Filed Feb. 25, 1963, Ser. No. 260,581
7 Claims. (Cl. 71—23)

This invention relates to an improved combined fertilizer, mulch and soil conditioner and to an efficient method of making the same. More particularly, this invention relates to a fertilizer, mulch and soil conditioner having bark or sawdust as base elements thereof and having plant nutrients carried by and integrally bonded with the base elements for controlled delayed release of the nutrients from the base elements.

It has long been recognized that it is desirable for normal plant metabolism to supply plants, by some suitable means, with nitrogen, phosphorus, and potassium. Accordingly, in the preparation of fertilizer or plant food mixtures, it has been the usual practice to mix one or several nitrogen, phosphorus and potassium compounds with a base material and/or to otherwise add one or more of such compounds to a base material.

In the fertilizers and plant foods commonly in widespread use today, there is normally a mere mixture of the base material and nutrient nitrogen compounds, phosphorus compounds and potassium compounds. While the mixture may serve to deliver the nutrient elements to the plants to facilitate normal plant metabolism, most all of the mixtures are highly water soluble, and as a result, the nutrient constituents are rapidly leached from any base material carrying the same, and/or from the soil surrounding the plant to which the mixture has been applied. Moreover, with mixtures of such type, there is little control over the quantity of nutrients delivered to the plant, aside from that which can be achieved by limiting the quantity of fertilizer or plant food applied to the soil, and/or by manually mixing the fertilizer or plant food with the particular soil in question. Since the human element enters the quantitative disposition of the plant food or fertilizer, and since the layman ordinarily believes that an excess of nutrients is better than a small deficiency, the nutrients are quite often delivered to the plants in a quantity which far exceeds desirable limits. A further problem which concerns mixtures such as discussed above results in the fact that the same do not normally provide any sustained aeration of the soil—i.e., they do not tend to render the soil more permeable to air and moisture.

In apparent recognition of the above discussed problems, it has previously been suggested that a soil conditioner be produced in which bark or wood materials are used as a mulch or base material, and in which such base material carries certain nutrients integrally bonded thereto. Consistent with this suggestion, desirable base nutrients, namely nitrogen and phosphorus producing compounds, are reacted with the base elements whereby the nutrients are retained over a larger surface and by three mechanisms which develop controlled leachability and feed the plant until the decay of the product is complete. While the prior suggestions along this line may have rendered some more satisfactory results, they still presented some problems. For example, production rates of fertilizers or plant foods or soil conditioners processed consistent with the reaction approach have been comparatively slow. Still further, certain basic nutrient ingredients, such as potassium, have remained in a condition where they could be easily leached from the base material and surrounding soil. Even further, products formed consistent with the reaction techniques of this paragraph, have been highly unbuffered so that they tend to burn or destroy the plant when even small excess quantities of the plant food, fertilizer, or soil conditioner are applied to the soil surrounding the plants.

The present invention is directed to providing a fertilizer mulch and soil conditioner which is free of all of the aforesaid disadvantages, and which provides for the controlled and delayed release of nutrients from a base material so as to render the soil to which the same is applied permeable to air and moisture. More specifically, a primary object of the present invention is to provide such a fertilizer, mulch and soil conditioner which permits the controlled and delayed release not only of nitrogen and phosphorus nutrients contained therein, but also of potassium or other nutrients contained therein and which further has a pH in the neutral range so as to prevent the possibility of plant destruction or burning by virtue of over-acidic and unbuffered soil conditions. A still further specific primary object hereof is to provide such a fertilizer, mulch and soil conditioner wherein the base material comprises, at least predominantly, waste material such as bark, sawdust or the like which has been comminuted to render the same of suitable segmental size.

An additional significant and basic object of the present invention is to provide a method of producing a fertilizer, mulch and soil conditioner conforming with the preceding objects and (1) wherein the treating and reaction times are reduced to a minimum by virtue of a novel combination of processing steps, and (2) wherein the processing steps are adapted readily to a continuous, as opposed to a batch-type operation. Consistent with this object, it is a further important aspect of the present invention to provide such a method wherein the chemicals in solution form or at least dispersed in an aqueous medium are so efficiently reacted with the base material (a) that the base material becomes highly saturated with the beneficial constituents of the solution; (b) that there is no need for any recycling of the chemical solution to obtain the full beneficial values from the quantities of chemicals reacted; and, (c) that immersion of the base material in excess solution is not required. Still, further, in this regard, it is an important aspect of the present invention to provide such a reaction method wherein the beneficial constituents of the chemical solution, namely, the nutrients, are by the process hereof integrally bonded with the base material for substantially controlled release therefrom until complete decay of the organic matter.

Yet other particularly significant objects of the method phase of this invention are: (a) to provide a method following the above stated objects, which method provides for neutralization of the product by incorporating in the treating solution used initially, a neutralizing composition which simultaneously additively supplies a nitrogen content to the product; (b) which method does not require any washing operation whatsoever; and, (c) which method further results in the continuous delivery, at a rapid rate, to an output station of a product which can immediately be bagged and stored or shipped.

Still additional, yet further and important objects of the present invention include: (a) the provision of a process and product conforming with all of the preceding objects and wherein a useful fertilizer, mulch and soil conditioner is obtained which is entirely safe for decay by bacterial action; (b) the provision of such a combined fertilizer, mulch and soil conditioner in which the normal acidity of the treating nutrient solution, which would limit product application as a mulch or soil conditioner, is neutralized; (c) the provision of such a combined fertilizer, mulch and soil conditioner in which all non-leachable nutrients are chemically bonded to the bark or other wood material employed as a base material whereby such nutrients are only released through decay and diffusion processes, thus providing a sustained fertilizer having additionally the beneficial qualities possessed by desirable humus materials; (d) the provision of a process of the character designated in which comminuted bark and/or other wood-like materials can be used as a base and treated simultaneously with nitrogen, phosphorus and potassium containing material in a minimum of time and to an appreciable extent, all without decomposition and without destroying the inherent humus forming qualities through carbonization; (e) the provision of a product of the character designated which possesses the advantageous nutrient supplying and humus-like qualities of both organic and inorganic fertilizers; and (f) the provision of a combined fertilizer, mulch and soil conditioner of the character designated which possesses excellent flow or distribution characteristics and heterogeneous uniformity permitting uniform nutrient release.

In its basic aspects, the present invention provides a fertilizer, mulch and soil conditioner which controllably releases nutrients for plant metabolism, and which is made by utilizing comminuted raw material naturally occurring in plant residues heretofore regarded as waste, such as barks, sawdust and other wood-like materials, and continuously treating the same in a prescribed manner with an aqueous solution of urea, phosphoric acid, potassium chloride and ammonium hydroxide, and then drying the treated material at a temperature below the temperature at which carbonization and loss of nitrogen takes place. However, the invention will be better understood after considering the following detailed description thereof. Such description refers to the attached drawing which is a flow sheet presenting schematically sequential operating and/or processing steps performed in accordance with the invention.

In preparing a base material for use in the process hereof, an organic wood-like material, such as bark or sawdust or a mixture thereof obtained from pine bark accumulation containing a small percentage of hardwood bark, is ground or pulverized in a suitable comminuting means 10, which can comprise a conventional grinder, hammer-mill or the like. The comminuting means reduces the base material to a mass of small particle size, such mass preferably including only particles which will pass a one-eighth inch screen. The comminuted base material can well be delivered to a storage bin 11 until desired for use. The particular manner in which the base material is reduced to particles can be varied widely, the only prerequisite being that the ultimate particles have a sufficiently small size that they are readily adaptable to the reaction steps described below. At the same time, for proper reaction, to facilitate conveyance of the mass, and to otherwise easily handle and treat the mass with maximum efficiency, particles which pass a screen having openings of the order of one-eighth inch have been found to be particularly satisfactory.

Regardless of the comminuting technique employed, the comminuted wood-like mass, at desired intervals is fed from the storage bin 11 to a reaction mixer 13. The feeding is preferably accomplished by means of a screw conveyor 12 into which steam is introduced for purposes of a pre-heating of the comminuted mass. The residence time of the comminuted mass in the screw conveyor can be varied, but in any event the material should remain a period sufficient for the material to attain a temperature of between 120° F. and 190° F., but preferably 140° F. to 160° F. As will become apparent below, the temperature treatment can be intermittent if batch-type process is used, as where a pre-heated mass is being further processed while another mass of the comminuted material is undergoing pre-heating treatment for subsequent further processing. However, in accordance with the preferred embodiment hereof, the steam treatment is carried out with continuous movement of a comminuted mass through screw conveyor 12, and subsequent continuous further processing thereof. The important factor is that the comminuted wood-like mass be pre-heated to within the ranges prescribed above in a highly humid atmosphere so as to render the same in a condition for efficient and rapid reaction with chemical solutions used in accordance herewith as discussed more fully in following paragraphs.

Consistent with the preceding discussion, the material as pre-heated is introduced into the reaction mixer 13. Preferably, this mixer is in the form of a driven tumbler cylinder provided with spray means for introducing liquid solution therein. Additionally, if desired, the reactor can be provided with parallel paddle agitators to insure adequate and complete mixing of the comminuted mass and solution delivered thereto.

The use of a tumbling drum-type reaction mixer with a spray means for delivering solution therein has been found to be particularly effective in carrying out the process hereof. Such construction permits the continuous substantially uniform application and delivery of solution to the comminuted mass as it enters the reaction mixer. Moreover, the construction is particularly effective since, in accordance with the invention, there is no need for using an excess of solution for the comminuted masses being treated. As indicated above, and as explained more fully below, the invention does not require a recycle of solution, and instead preferably provides for continuous delivery of a predetermined quantity of nutrients, in solution, which quantity and the diluent therefor is absorbed and reacted, substantially in its entirety, with the comminuted mass undergoing reaction in the mixer. For this purpose, the ratio of comminuted mass to solution is closely controlled.

Having now discussed the pre-heating treatment of the comminuted base material, and the delivery thereof to the reaction mixer with the chemical solution desired, and before discussing the mass to solution ratio control, it is desirable to consider the preferred formation and handling of the solution prior to its introduction within the reaction mixer. The nutrient compositions utilized include KCl, $H_3PO_4$, UAS—S and $NH_4OH$, as indicated in respective storage containers 15, 19, 21 and 24 shown on the attached flow sheet. All the nutrient compositions are in solution except the KCl, and thus the storage containers 19, 21, and 24 can well comprise tanks, whereas storage container 15 can well comprise a bin-type unit.

The nutrient compositions, as well as water and steam supplied respectively from storage containers 17 and 27, are all delivered to a common initial mixing tank 14. However, the delivery is controlled so as to obtain the desired preselected solution for introduction to the reaction mixer 13.

To achieve the controlled delivery, the potassium chloride (KCl), as maintained in storage container 15, can be fed therefrom to the initial mixing tank through a suitable selectively controllable feed device 16 such as, for example, a batch scale.

Similarly, a pre-set quantity of water, which serves as a diluent, can be metered and fed from storage container 17 through a suitable selectively controllable flow meter 18 into tank 14. The concentrated phosphoric acid as stored in storage container 19 is also metered through a suitable selectively controllable pre-set flow meter 20 into tank 14. The urea, as maintained in an aqueous ammoniacal solution in storage container 21, is fed by another selectively controllable pre-set flow meter 22 into the mixing tank 14. The solution of ammonium hydroxide, as stored in container 24, is delivered, if desired, through a similar flow meter 25 into the initial mixing tank. Under the control of adjustable pre-set flow meter 28, steam is admitted into tank 14 in order to agitate, dilute and pre-heat the solution therein to a temperature preferably of approximately 140° F. The steam is provided by a suitable generator showing diagrammatically at 27.

To insure proper initial mixing in tank 14, an agitator 26 is provided therein. The construction of the agitator, of the flow meters, of the mixing tank, and of the steam generator, as well as the construction of the reaction mixer 13 and drive 13a therefor, can be conventional. The apparatus discussed facilitates performing the process provided hereby, but other than as indicated to the contrary, the same can be widely varied depending on the preference of the particular operator.

Regardless of the initial mixing technique employed, the initially mixed and pre-heated solution is fed from tank 14 to the spray device 29 of reaction mixer 13. Concurrently therewith, the wood-like comminuted material is conveyed into the tumbling cylinder digester, i.e., reaction mixer 13, and the spray means 29 applies the pre-heated solution to the pre-heated comminuted mass. As indicated above, the simultaneous admission of the comminuted mas which has been pre-heated, with the nutrient solution, as pre-heated, provides for an admixing which desirably saturates the particles of the mass with the solution, although there is no immersion of the mass in an excess of solution. The reaction mixer preferably operates continuously with the comminuted mass from conveyor 12 and nutrient solution from tank 14 being continuously fed thereto. If desired, a flow meter 14a can be used to control the flow of solution to spray means 29.

As indicated above, the delivery of the pre-heated nutrient solution to and through the spray means 29 with the concurrent introduction of the pre-heated and humidified base material facilitates obtaining a fast reaction time. Specifically, this technique has been found to permit a continuous comparatively short admixing and initial reaction time such that the mass and solution as admixed can be easily fed continuously to a subsequent drying means wherein the reaction is completed and the reacted material dried to a desired moisture content. Further, this technique has been found to be so efficient that the pre-heated comminuted mass and pre-heated nutrient solution are so reacted that solution drain-off and re-cycle are not required.

Now, again turning particularly to the attached flow sheet, it will be noted that the reaction mixer is shown as feeding directly to the dryer 13. For this purpose, the reaction mixer, in addition to including a tumbling cylinder as prescribed above, can well also include a screw conveyor for delivery of the admixed mass and solution from the reaction mixer directly to the dryer. Although an additional conveyor can be considered as separate from the reaction mixer, it is considered herein as part of the reaction mixer 13 because, in such screw conveyor, the admixed comminuted mass and solution is experiencing at least some reaction. Specifically, with the initial distribution of the nutrient solution to the comminuted mass simultaneously with the entry of the comminuted mass into the reaction mixer, an initial reaction starts. As the material is additionally admixed in the tumbling cylinder portion of the reaction mixer, there is continued reaction. Further, as the material passes, or is delivered, from the reaction mixer to the dryer, there is further reaction. Thus, the delivery means, namely, the additional screw conveyor referred to above, has therein material which is undergoing reaction, and accordingly, can properly be viewed as part of the reaction mixer. In essence, then, there is an admixing and initial reaction taking place from the time the comminuted mass is sprayed with the nutrient solution until the time the same is delivered to the dryer 30. Consistent with the invention, the reaction is completed in the dryer 30, and moreover, the reacted material is dried to a preferred moisture content.

From the dryer 30, the material, particulate in form, is transferred by an air conveyor 31 to a cyclone separator 32. The material fed out of the separator 32 is passed to a storage bin 33. As desired, the material is delivered from the storage bin through a meter 34 to an automatic bagging device 35.

With the above described aparatus arrangement and processing steps, the operation is continuous. While the speed of delivery can be carried, it has been found that an admixing and initial reaction period, or penetration period of at least 5 minutes is desirable. Thus, the speed of the operation is preferably so adjusted that the time required for a given volume of mass to pass from its initial admixing with the nutrient solution to the input to the dryer is approximately 5 minutes. In other words, drying of any given volume of mass is started aproximately 5 minutes after its initial admixing contact with the nutrient solution. The 5-minute time, however, is prefered and not absolutely critical.

It will be appreciated that the throughput values of the nutrients can be varied by controlling the quantities of nutrient containing compounds initially mixed in tank 14 and then reacted with the comminuted mass. The phosphoric acid solution, urea ammoniacal solution and ammonium hydroxide solution can be standard solutions of high concentration, and in such case, any change of values desired in the final product, is accomplished by varying the output of the respective meter controls 16, 20, 22 and 25 from the nutrient storage containers. All of the meter controls thus permit selective adjustment of the nutrient values in the final product.

It should be here noted that other leachable elements, other than the nutrients suggested, can be delivered to the initial mixing tank 14, if desired. All active elements so delivered and reacted as aforesaid, become integrally bonded with the particles of the base comminuted mass so that leaching is at least substantially prevented, and controlled nutrient or active ingredient release is achieved.

Now, turning to analysis of the nutrient solutions, the following formulations, readily commercially available and/or easily prepared, have proved particularly satisfactory:

Urea-ammonia solution (total effective nitrogen content is 26.2%)_ {44.0% urea. 7.0% $NH_3$. 49.0% $N_2O$.
Ammonium hydroxide _____ 30% concentration.
Phosphoric acid _____ 75% concentration.
  (Total effective $P_2O_5$ is 54.4%.)
Potassium chloride (in solid powder)
  Total effective $K_2O$ equals 62.%.

Notwithstanding these formulations, however, any urea and ammonia solutions and/or compounds can be used as the nitrogen sources. The controlling factor is that a suitable nitrogen source, or suitable nitrogen sources are incorporated, which sources are commericially satisfactory.

As is well known, fertilizer concentrations are conventionally stated in ratios of nitrogen, phosphorus and potassium. Common fertilizer compositions, in accordance with this identifying technique include 10–6–4, 5–10–5, 8–8–8, and 5–3–2 mixtures. Further, under this identifying technique, the phosphorus is effective as determined by the quantity of $P_2O_5$, and the potassium is effective as determined by the quantity of $K_2O$.

The following table sets forth examples of the amounts of the nutrient containing compounds and compositions, in concentrations as listed above, which can be added to the mixing tank 14 for the common nitrogen-phosphorus-potassium ratios which can be obtained in products produced in accordance with the preferred embodiments of the method provided hereby, as described above.

circulated by the screw, preferably from the base portion thereof, thus affording an advantageous circulation of the

*Table*

| Nutrient Ratio | Bone Dry Weight of Wood-Like Material (lbs.) | Quantity of Nutrient Solution Added (lbs.) | Ratio Mass: Solution With $H_2O$ Added | Ratio Mass: Solution Without $H_2O$ | Product pH | Weight of KCl Added (lbs.) | Quantity of Urea—$NH_3$ (lbs.) | Quantity of $H_3PO_4$ (lbs.) | Quantity of $NH_4OH$ (lbs.) | Quantity of Makeup $H_2O$ (lbs.) |
|---|---|---|---|---|---|---|---|---|---|---|
| 10-6-4 | 56.34 | 78.41 | 0.72:1 | 0.95:1 | 6.2 | 8.06 | 47.75 | 13.80 | 0 | 18.80 |
| 5-10-5 | 61.71 | 87.50 | 0.70:1 | 1.07:1 | 6.2 | 10.10 | 10.30 | 23.00 | 14.45 | 29.74 |
| 8-8-8 | 50.91 | 73.51 | 0.69:1 | 0.91:1 | 6.2 | 16.15 | 31.91 | 18.38 | 5.97 | 17.40 |
| 5-3-2 | 78.17 | 83.30 | 0.93:1 | 2.24:1 | 6.2 | 4.03 | 23.87 | 6.90 | 0 | 48.50 |

Consistent with this table, and the preferred embodiments of the present invention, the respective base chemical compounds are present in the nutrient solution within the following ranges:

| Chemical | Upper Limit, Percent | Lower Limit, Percent |
|---|---|---|
| (a) Urea | 27.4 | 7.8 |
| (b) Ammonium hydroxide | 19.6 | 7.7 |
| (c) Phosphoric acid | 31.3 | 7.4 |
| (d) Potassium chloride | 24.7 | 4.3 |

From the above table, it will be noted that the pH in each instance is in the neutral range (6-8). This is accomplished by neutralizing the phosphoric acid with the ammonia-urea mixtures or aqua-ammonia which results from the initial mixing in tank 14. The neutralization is thus accomplished with a nitrogen source giving the desired pH while at the same time additively yielding the desired ultimate nitrogen content. Here it should be noted that ammonium hydroxide may be added individually as a means of adjusting the nutrient content of the mixture. Instead, it would be added as part of the UAS solution as in the cases of the 10-6-4 and 5-3-2 ratios set forth in the above table.

From the above table, it will be further noted that the values of the nutrient ratios can be controlled to give the best composition for the final product desired for a particular use. Accordingly, plant foods having widely varied relative percentages of nitrogen, phosphorus and potassium can be produced in accordance with the invention, so as to adapt a product for use on special crops. Potassium can be eliminated, for example. The basic product produced hereby, in any event, has the qualities of both organic and inorganic fertilizers in that it has humus-like materials with sustained nutrient value.

If some particular high initial nutrient delivery is desired, the dry product leaving dryer 30 can be blended with additive ingredients or plant nutrients in a blending mixer whereby the additives are subject to easy initial leaching.

From the foregoing, it will be seen that an improved fertilizer, mulch and soil conditioner (hereinafter referred to individually and collectively as a plant food) and process for producing the same has been devised. By bonding the nitrogen, phosphorus and potassium chloride by chemical reaction and by diffusion within, the comminuted material in accordance with the present process, the nutrients are released over prolonged periods and without substantial risk of injury to plants treated with the product. Furthermore, since the phosphoric acid has been neutralized by utilization of ammonium hydroxide in order to give pH in the neutral range (i.e., 5.5 to 8.0), there is no likelihood of burning the roots in contact with the soil plant food mixtures.

Insofar as the steam is concerned, particularly desirable results are obtained when live steam at 60 p.s.i.g. is used for the pre-heating treatment. The use of a screw conveyor for the pre-heating treatment of the comminuted mass provides a confined area wherein the steam is spirally circulated by the screw, preferably from the base portion thereof, thus affording an advantageous circulation of the steam and efficient uniform preparatory treatment of the comminuted base material without any undesirable carbonization.

With respect to the temperature to which the nutrient reacting solution is pre-heated, there can also be some variation in temperature. However, for particularly desirable results, this temperature should remain between an upper limit of 160° F. and a lower limit of 110° F., with the optimum temperature of 140° F. being preferred. Within the varied ranges of pre-heating temperatures for both the comminuted mass and nutrient solution, the desirable reaction time can vary, but the same need not exceed 10 minutes under any variation consistent herewith.

As indicated above, the particular reaction mixer and dryer used can be varied. However, the tumbler-type reaction mixer with a spray solution input feed permits the rapid introduction of solution and comminuted mass with generally uniform solution distribution, whereby reaction time after mass and solution introduction is minimized and substantial uniformity in nutrient distribution throughout the comminuted mass is achieved during the period of agitated reaction. The use of a screw conveyor between the tumbler and the dryer further facilitates this result. For efficient drying without carbonization, a three-pass, oil fed rotary kiln, utilizing Bunker "C" oil has proved particularly satisfactory. The maximum dryer temperature should not exceed the temperature at which carboniaztion and loss of nitrogen takes place—i.e., the maximum temperature should not exceed 230° F.

The dryer temperature can, of course, be varied, and in this manner the final product can be dried to a prescribed moisture content, such moisture content preferably being between 15 and 25%, with a most desired moisture content of 20%. However, it has been found that control of the final moisture content is more easily maintained by varying the quantity of diluent $H_2O$ added to the nutrient solution and maintaining the dryer temperature at least substantially constant as measured by the temperature of exhaust gases from the output end of the dryer. Specifically, a maximum dryer temperature of 155° F., as measured above, is entirely satisfactory when the quantity of diluent $H_2O$ in the nutrient solution is controlled such that the total $H_2O$ content of the comminuted mass-solution initial admixture is such that the dryer, at this temperature, serves to dry the reacted material passing therethrough to a 20% moisture content.

Another particularly important variable concerns the ratio set forth in the table for mass to solution. Even though such table contains a preferred ratio of wood-like material to solution admixed therewith for each nutrient ration there stated, it has been found that the ratio of wood-like material (bone dry) to solution (with water) can be varied between preferred limits of 0.69:1 and 0.93:1 with the results still being particularly effective. Considering the ratio of wood-like material (bone dry) to solution (without diluent water) admixed therewith the ratio can be varied between preferred limits of 0.90:1 and 2.24:1. The ratio "with water" is possibly most definitive because it clearly demonstrates the fact that the process hereof does not involve an immersion or soaking technique and instead is adapted to a convenient continuous process without any recycle requirements. Still further, the "with water" ration takes into account the water or moisture in the bark and therefore the ratio is accurate as to the absolute solution in the initial admixture of bark and liquid.

Since with the process disclosed herein reaction time is minimized, it has been found that the apparatus arrangement shown and discussed, permits performance of the process at very desirable speeds. For example, with a reaction mixer having a 16' length and 30" diameter, a mixing tank having 100 gallon capacity, and other conventional apparatus for handling the mass as described, a production rate exceeding three tons per hour can easily be achieved. To this end, the air conveying cyclone-separator arrangement is particularly effective since it delivers a cooled product to the storage bin 33.

After reading the foregoing detailed description of the invention, it should be readily apparent that the objects set forth at the outset of this specification have been successfully achieved. Accordingly, what is claimed is:

1. In a process for producing a plant food, the steps of:
   (a) pre-heating comminuted lignocellulose material in a steam environment to a temperature of between 160° F. and 180° F.;
   (b) pre-heating an aqueous solution of urea, phosphoric acid, ammonia and potassium chloride to a temperature of between 130° F. and 150° F.;
   (c) then agitatingly reacting the pre-heated comminuted lignocellulose material with the pre-heated aqueous solution for approximately five minutes whereby nitrogen, phosphorous, and potassium compounds are chemically bonded within said material;
   (d) thereafter drying the reacted material at a temperature below 230° F. until the moisture content thereof is approximately 20%; and,
   (e) recovering the dried reacted material.

2. In a process for producing a plant food, the steps of:
   (a) pre-heating particulate lignocellulose material in a steam environment to a temperature of between 160° F. and 180° F.;
   (b) pre-heating an aqueous solution of plant nutrient chemical compositions including phosphoric acid and a nitrogen producing source selected from the group consisting of urea, ammonia and combinations thereof to a temperature of between 130° F. and 150° F.;
   (c) then agitatingly reacting the pre-heated comminuted lignocellulose material with the pre-heated aqueous solution for less than ten minutes whereby said plant nutrient chemical compositions are chemically bonded within said material;
   (d) thereafter drying the reacted material at a temperature below 230° F.; and,
   (e) recovering the dried reacted material.

3. A process as defined in claim 2 wherein the weight ratio of the lignocellulose material to the solution is between .90:1 and 2.24:1, wherein step (c) is carried out for approximately five minutes, wherein the temperature of step (a) is approximately 170° F., and wherein the temperature of step (b) is approximately 140° F.

4. A process as defined in claim 2 wherein urea is present in said solution in an amount between 27.4 and 7.8%, ammonium hydroxide is present in said solution in an amount between 19.6 and 17.7%, phosphoric acid is present in said solution in an amount between 31.3 and 7.4%, and potassium chloride is present in said solution in an amount between 24.7 and 4.3%.

5. In a process for producing a plant food, the steps of:
   (a) pre-heating comminuted lignocellulose material in a steam environment to a temperature of approximately 170° F.;
   (b) pre-heating an aqueous solution consisting essentially of urea, phosphoric acid, ammonia and potassium chloride to a temperature of approximately 140° F.;
   (c) introducing the pre-heated comminuted lignocellulose material into a reaction zone while simultaneously spraying the pre-heated aqueous solution onto said material;
   (d) then agitatingly reacting the pre-heated comminuted lignocellulose material with the pre-heated aqueous solution for approximately five minutes whereby nitrogen, phosphorous and potassium compounds are chemically bonded with said material;
   (e) thereafter drying the reacted material at a temperature below 230° F. until the moisture content thereof is approximately 20%; and,
   (f) recovering the dried reacted material.

6. In a process for producing a plant food, the steps of:
   (a) pre-heating comminuted lignocellulose material in a steam environment to a temperature of between approximately 120° F. and 190° F.;
   (b) pre-heating an aqueous solution of plant nutrient chemical compositions including phosphoric acid and a nitrogen producing source selected from the group consisting of urea, ammonia and combinations thereof to a temperature of between approximately 110° F. and 160° F.
   (c) introducing the pre-heated comminuted lignocellulose material into a reaction zone and feeding the pre-heated aqueous solution onto said material;
   (d) then agitatingly reacting the pre-heated comminuted lignocellulose material with the pre-heated aqueous solution to chemically bond plant nutrient compounds within said material;
   (e) thereafter drying the reacted material at a temperature below 230° F.; and
   (f) recovering the dried reacted material.

7. A process as defined in claim 6 wherein said comminuted lignocellulose material consists of particles having a size such that they will pass through a ⅛ inch screen.

References Cited by the Examiner
UNITED STATES PATENTS

| | | | |
|---|---|---|---|
| 2,092,100 | 9/1937 | Waynick | 71—23 |
| 2,150,164 | 3/1939 | Heath et al. | 71—23 |
| 2,498,480 | 2/1950 | Bierlich | 71—23 |
| 2,735,756 | 2/1956 | Farber | 71—23 |
| 2,881,066 | 4/1959 | Sproull et al. | 71—23 |
| 2,901,339 | 8/1959 | Boomer et al. | 71—23 |
| 2,985,643 | 5/1961 | Boomer et al. | 71—23 |

DONALL H. SYLVESTER, *Primary Examiner.*

ANTHONY SCIAMANNA, *Examiner.*